Patented Sept. 26, 1933

1,927,930

UNITED STATES PATENT OFFICE 1,927,930

PRODUCT COMPRISING AMORPHOUS BODIES

Carleton Ellis, Montclair, N. J., assignor to Ellis-Foster Company, a corporation of New Jersey No Drawing. Application May 31, 1929
Serial No. 367,620

3 Claims. (Cl. 106—23)

This invention relates to plastics containing sulphur and relates especially to products containing methylene sulphide or its polymers incorporated with other sulphur-containing bodies, such as sulphur resins, including those made from phenol or phenolic bodies and sulphur chloride and the like.

Examples of preparation of methylene sulphide are the following, representing parts by weight: Aqueous formaldehyde of 37 per cent strength, 136 parts, sodium hydroxide 60 parts, sulphur 96 parts, water 150 parts. The sulphur, sodium hydroxide and water were mixed and boiled under a reflux condenser until the sulphur was dissolved, forming sodium sulphide. The solution was cooled and the formaldehyde added and allowed to stand at room temperature for two or three days, or until reaction has gone substantially to completion. A yellow product consisting of filaments or fragments of rubbery material was obtained. This was washed in warm water until the wash waters were free from soluble compounds.

A resin was made from phenol and sulphur monochloride by reacting upon the phenol with 150 per cent by weight, that is, 1.5 parts of sulphur monochloride to one part of phenol, to form a resin. Chlorine was passed through this resin for a short time then the product was blown with steam and baked at 120° C. for 20 hours. The methylene sulphide obtained as above was mixed in the proportion of 7 parts by weight with 3 parts of the phenol sulphur resin and was heated to about 130° C. There was some foaming due to the escape of moisture, etc., and a melt was finally secured which was clear and which furthermore on cooling remained clear and homogeneous, the methylene sulphide and the sulphur resin being miscible and forming a solid solution. The product was soft and gummy, easily indented by pressure with the finger, possessing somewhat the qualities of a pitch, but not being as sticky as most pitches.

When the proportions were reversed and a major proportion instead of a minor proportion of the phenol sulphur resin was used, a much harder product resulted. This was obtained as a brown rather tough resin (harder and less readily indented with the finger nail) on melting together 30 parts of the methylene sulphide and 70 parts of the aforesaid phenol sulphur resin. By varying the proportions of resin in this manner it therefore becomes possible to secure products of varying degrees of consistency and hardness, ranging from soft pitches or very easily deformed gummy masses to comparatively hard resinous masses.

Another sulphur resin prepared by reacting on phenol with 250 per cent of sulphur chloride could be similarly blended with the methylene sulphide. Using the proportions of 70 parts of this resin to 30 parts of the methylene sulphide prepared as above, the product was soft, gummy and not as clear as the compositions set forth above. There was a very slight opacity. However, the product, except for this incipient opacity, appeared to be homogeneous and was quite similar in its physical properties to that made in like proportions when using the sulphur resin first mentioned.

When 30 parts of methylene sulphide prepared as above was melted with the 250 per cent phenol sulphur resin, the temperature being raised until momentarily 150° C. was reached then cooled, a hard and quite tough resinous mass resulted.

Other products of the methylene sulphide type were made in the following way: 68 parts aqueous formaldehyde of 37 per cent strength, sodium hydroxide 30 parts, sulphur 49 parts. Water was not added. To the formaldehyde solution sulphur was added and then caustic soda introduced gradually with cooling. This gave results which are considered preferable to the step of dissolving the sodium hydroxide in the formaldehyde solution and then adding sulphur. The composition made in this manner was allowed to stand for several days at room temperature rather than to apply external heat, as the reaction becomes rather violent with loss of formaldehyde if the temperature is greatly raised. The reaction product was washed in like manner.

In another case paraform 80 parts, sodium hydroxide 60 parts, sulphur 96 parts and water 150 parts were reacted together at room temperature. A somewhat more rubbery mass was obtained in the last mentioned case which could be sheeted and washed with water using rolls. It differed from the product made with the aqueous formaldehyde in that it was a coherent, rubbery, extensible mass, while that obtained from the aqueous formaldehyde possessed more the character of the precipitate and was a flocculent, powdery or slightly granular material.

Instead of using sodium hydroxide or caustic soda, other alkaline substances capable of forming sulphides with free sulphur may be used, including potassium hydroxide or caustic potash, calcium oxide and hydroxide, barium oxide and hydroxide, etc. With the formaldehyde or paraform or other forms of $CH_2O$ there may be used other aldehydes, such as acetaldehyde and higher aldehydes convertible into resinous bodies or sulphur plastics on contact with alkalis or alkaline sulphides respectively. The products made by reaction of alkaline sulphides or polysulphides on formaldehyde, aqueous or anhydrous, or in the presence of a reaction medium such as methyl or ethyl alcohol and the like may be used for various purposes in combination with a modifying agent such as a miscible sulphur compound, including sulphur resins. Mixtures of this character are proposed for employment in the rubber industry, in making rubber compound, in the chewing gum industry and in various plastic industries, including molded products for insulation, and so forth. The composition may be applied to cloth, leather and other porous or fibrous materials to coat or impregnate with a flexible, water-resisting or preservative coating or impregnation respectively.

The comparative absence of odor in methylene sulphide material made from formaldehyde, paraform and the like and alkaline sulphide renders such material useful in a number of applications where sulphides of the lower olefins made in other ways and possessing a pronounced odor might be objectionable. The method of making polymerized methylene sulphide in this manner to yield with a miscible resin or other miscible modifying agent substances of improved properties or possessing properties rendering them capable of wider application constitutes a feature of the present invention. In order to secure the best possible blend or miscibility of the polymerized methylene sulphide and its modifying agents, such as a phenol sulphur resin, I prefer to eliminate all water and other material volatile at or below the temperature at which water boils. The preferred composition, therefore, is anhydrous or substantially so, preferably is free or substantially free from odor. In this connection the fluxing action of the phenol sulphur resins noted is such that mixtures thereof may be melted and blown with superheated steam or treated with steam in vacuo or in any other manner in the molten state to eliminate odor. Such an anhydrous, substantially odorless plastic may be expected to find a much wider use in the industries than one which contains moisture and is low in insulating value or which contains substances of unpleasant odor that would render the composition objectionable in such products as chewing gum or as seals for bottles, as sealing wax and for various other purposes.

While I have illustrated the modifying agent of the methylene sulphide by the employment of phenol sulphur resin, it should be understood that the term phenol is used in an illustrative sense specifically to include cresol, xylenol and other phenolic sulphur resins and those of naphthol and other analogous bodies and generically to embrace modifying agents of a miscible character, especially those containing sulphur. The methylene sulphide itself in the gummy plastic form preferably employed in the present invention is scarcely soluble in any of the common organic solvents, nevertheless it dissolves readily or incorporates easily with the sulphur-containing resins aforesaid to form transparent, homogeneous synthetic balsams, synthetic pitches and synthetic resinous compositions applicable as aforesaid to the various industries, either by themselves or incorporated with the various mineral fillers such as china clay, whiting, asbestos, mica and the like, or vegetable fibre fillers such as ground wood, ground cork, cotton fibre, and so forth. Incorporated with these fillers the fluxing action of the phenol sulphur resin modifying agents enables sheeting, milling and other operations to be carried out to obtain floor coverings which may be substituted for ordinary linoleum, gaskets, packing and shaped articles made by molding in variously shaped molds.

What I claim is:

1. A plastic comprising methylene sulphide and a sulphur-containing resin as a modifying agent blended therewith.

2. A plastic comprising methylene sulphide and more than its weight of a sulphur resin as a modifying agent blended therewith.

3. A plastic comprising a mixture of a methylene sulphide and a phenolic sulphur resin as a modifying agent blended therewith.

CARLETON ELLIS.